United States Patent [19]
Kelly

[11] 3,779,274
[45] Dec. 18, 1973

[54] PRESSURE REGULATOR
[75] Inventor: Samuel T. Kelly, Torrance, Calif.
[73] Assignee: Robertshaw Controls Company, Richmond, Va.
[22] Filed: Nov. 21, 1972
[21] Appl. No.: 308,619

[52] U.S. Cl............ 137/505, 137/494, 137/505.38, 137/517
[51] Int. Cl.......................................... F16k 31/385
[58] Field of Search............... 137/494, 505, 505.38, 137/517

[56] References Cited
UNITED STATES PATENTS
| | | | |
|---|---|---|---|
| 3,108,611 | 10/1963 | Ketler | 137/494 |
| 3,463,182 | 8/1969 | Evans | 137/494 |
| 3,718,152 | 2/1973 | Kraakman | 137/517 |

Primary Examiner—Harold W. Weakley
Attorney—Anthony A. O'Brien

[57] ABSTRACT

A pressure regulator including a housing having inlet and outlet ports and a valve seat communicating with the inlet port, a flexing member mounted in the housing to form a chamber therein and a cover press fitted in the housing to retain the flexing member and having an annular fulcrum engaging the flexing member, the flexing member being flexed at a ring disposed within the fulcrum to move a valve face portion of the flexing member toward and away from the valve seat to regulate outlet pressure. In one embodiment the flexing member includes a rubber diaphragm with a metal spring disc secured thereto, and in another embodiment the flexing member is a thin, flexible metal disc providing the functions of both spring and diaphragm.

15 Claims, 4 Drawing Figures

PRESSURE REGULATOR

BACKGROUND OF THE INVENTION

1. Field of the Invention

The present invention pertains to flow control devices and, more particularly, to pressure regulating devices.

2. Description of the Prior Art

Pressure regulators are conventionally utilized in flow control systems and are of particular importance in regulating the pressure of fuel supplied to appliances which should be operated with fuel supplied within specific pressure ranges. For instance, combination control devices for supplying fuel to burner apparatus conventionally utilize a pressure regulator to control a main diaphragm valve by sensing outlet pressure such that the outlet pressure is maintained at a preset valve. In order to set the pressure at which the fuel is to be regulated at the outlet of the combination control device, a coil spring is normally mounted in compression between a valve member and a set screw such that adjustment of the set screw varies the force or pressure applied to one side of the valve member while the other side of the valve member senses flow pressure to be regulated. Thus, flow through a valve seat cooperating with the valve member is controlled to regulate pressure in accordance with the preset valve.

Pressure regulators have many uses and variations in structure, such as for self regulating valves, valves controlling a main valve to effect outlet pressure regulation, and the like; however, prior art pressure regulators have invariably included relatively complex structure for adjusting the preset valve for pressure regulation. For many applications, such adjusting structure is unwanted from both cost and use standpoints in that only a single setting of the pressure regulator is required; and, accordingly, prior art pressure regulators have the disadvantages of being overly complex and expensive in many cases.

SUMMARY OF THE INVENTION

Accordingly, it is a primary object of the present invention to provide a pressure regulator of simplified structure overcoming the above disadvantages of the prior art.

An additional primary object of the present invention is to provide a pressure regulator with an integral diaphragm pan and spring.

Another object of the present invention is to eliminate the need for a coil spring in a pressure regulator.

A further object of the present invention is to facilitate setting of pressure regulators during assembly thereby not requiring adjustment in the field.

The present invention has an additional object in the production of an inexpensive pressure regulator for use with a combination control device to provide pressure regulation during step-opening valve operation.

Yet another object of the present invention is to utilize a single member as a diaphragm, pan and spring in a pressure regulator, the member being constructed of metal and not adversely affected by extreme temperatures.

An additional object of the present invention is to utilize spring disc in a pressure regulator, the discharging stiffening ribs engaging an annular fulcrum and a flexure ring about which the disc flexes disposed within the fulcrum.

Some of the advantages of the present invention over the prior art are simple, economic construction, the elimination of the need for a coil spring without requiring additional components, and the ease of adjustment during assembly.

The present invention is generally characterized in a pressure regulator including a housing having inlet and outlet ports and a valve seat communicating with the inlet port; flexing means including a diaphragm having a peripheral margin mounted in the housing and a valve face cooperating with the valve seat, and a spring having a flexure ring surrounding the valve face, the flexing means being flexible about the flexing ring; and a cover for retaining the flexing means in the housing and including a fulcrum engaging the flexing means at a position between the peripheral margin and the flexure ring whereby flexing of the area of the flexing means between the position engaging the fulcrum and the peripheral margin in a first direction causes movement of the valve face in an opposite direction.

Other objects and advantages of the present invention will become apparent from the following description of the preferred embodiments taken in conjunction with the accompany drawings.

DESCRIPTION OF THE PREFERRED EMBODIMENTS

Figure 1:
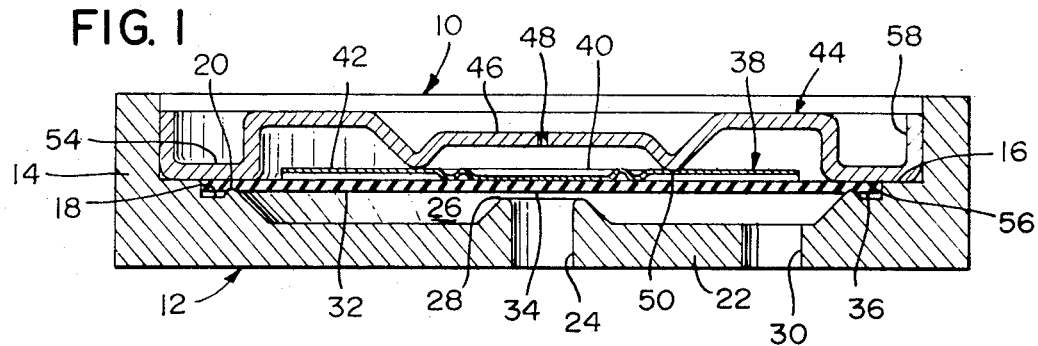
FIG. 1 is a section of a pressure regulator according to the present invention without fluid supplied thereto.
Figure 2:
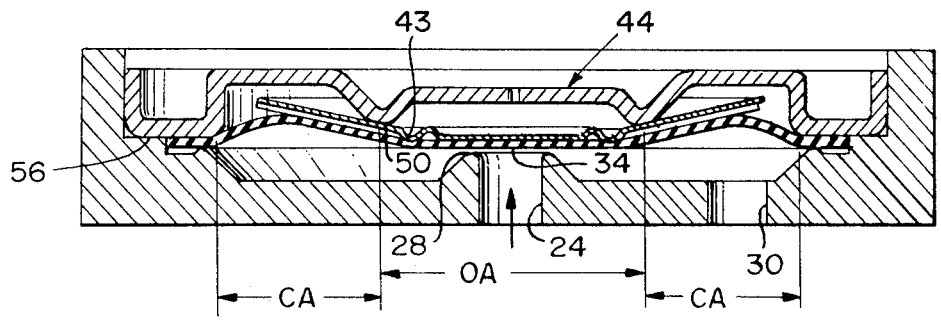
FIG. 2 is a section of the pressure regulator of FIG. 1 during regulation operation.

A pressure regulator 10 according to the present invention is illustrated in FIGS. 1 and 2 and includes a housing 12 having a cylindrical side wall 14 with an inner surface terminating at an annular should 16. An annular recess 18 is formed in shoulder 16 to define an annular bead 20 which extends above the bottom of recess 20 a distance less than should 16. Housing 12 has a base 22 with a central inlet port 24 therein communicating with a chamber 26 within the housing through a valve seat 28. An outlet port 30 is also formed in base 22 communicating with chamber 26.

Figure 3:
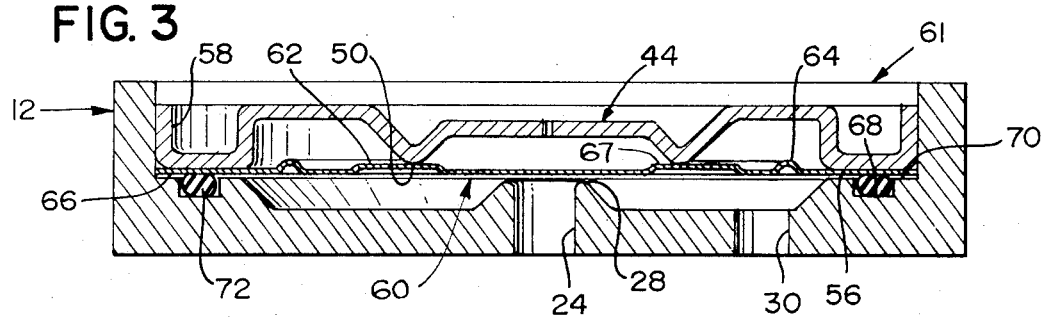
FIG. 3 is a top, plan view of the spring disc of the pressure regulator of FIG. 1.

Chamber 26 is defined at an upper end by a flexing member including a flexible, rubber diaphragm 32 which has a central, valve face portion 34 cooperating with valve seat 28 and a peripheral margin 36 supported with a fluid tight seal on bead 20 and extending over recess 18 and a flexible, integral diaphragm pan and spring 38 secured to diaphragm 32. Spring 38 is formed of a thin, flexible metal disc, as illustrated in FIG. 3, having an annular stiffening rib 40 in the center thereof and eight equally spaced, radial stiffening ribs 42 extending from positions spaced from central rib 40 to the periphery of the disc. The space between the ends of ribs 42 and rib 40 defines a flexure ring 43 which is weak relative to the surrounding portions of disc 38 to facilitate bending of the disc thereto.

A cover 44 is press-fitted in housing 12 and has a central portion 46 with an atmospheric vent 48 therein. Central portion 46 terminates peripherally at an annular projection 50 forming a fulcrum engaging the radial ribs 42 of disc 38, and a raised portion 52 extends from fulcrum 50 to an outer rim 54 having a U-shape in cross section with a surface 56 engaging shoulder 16 and peripheral margin 36 of diaphragm 32 and terminating at an upturned lip 58 engaging the inner surface of wall 14 of the housing.

In order to assemble pressure regulator 10, diaphragm 32 centrally carrying disc 38 is inserted in housing 12 with peripheral margin 36 seating on bead 20 and overlying recess 18. With the diaphragm and disc in place, cover 44 is press fitted in the housing with lip 58 frictionally engaging the inner surface of wall 14 for mechanical retention. Surface 56 of rim 54 of the cover compresses and clamps the peripheral margin 36 of diaphragm 32 against bead 20 of shoulder 16 with a fluid tight seal, and recess 18 receives any massing of the diaphragm material caused by compression of the peripheral margin. The pressure set point for the regulator is adjusted by the amount of depression of cover 44 into the housing which controls the relative positioning of fulcrum 50; and, accordingly, the pressure set point is easily adjusted during assembly with no adjustment in the field required.

In operation, the diaphragm 32 and disc 38 are relatively flat when the pressure regulator 10 is in the off condition prior to the application of fluid pressure thereto, as shown in FIG. 1. Once fluid pressure is supplied to pressure regulator 10, diaphragm 32 and disc 38 flex to the regulation condition as illustrated in FIG. 2 with slight exaggeration. Disc 38 flexes at the flexure ring 43 due to its relative weakness such that valve face 34 is deflected to a position adjacent valve seat 28 to effectively control flow therethrough. As shown in FIG. 2, the closing area CA of the diaphragm between fulcrum 50 and peripheral margin 36 is greater than the opening area OA of the diaphragm within the fulcrum 50; and, accordingly outlet pressure on the underside of diaphragm 32 causes the outer portion of disc 38 to move upward and the central portion of the disc to move downward which moves the central, valve face portion 34 of the diaphragm toward valve seat 28. Thus, as outlet pressure increases, flexure or bending of disc 38 at flexure ring 43 increases to move valve face 34 closer to valve seat 28 and reduce flow therethrough; and, similarly, as outlet pressure decreases bending of the disc decreases to move valve face 34 further from valve seat 28 to permit increased flow therethrough. Accordingly, pressure regulator 10 operates to control outlet pressure in the same general functional manner as conventional pressure regulators using coil springs but with far fewer parts.

Figure 4:
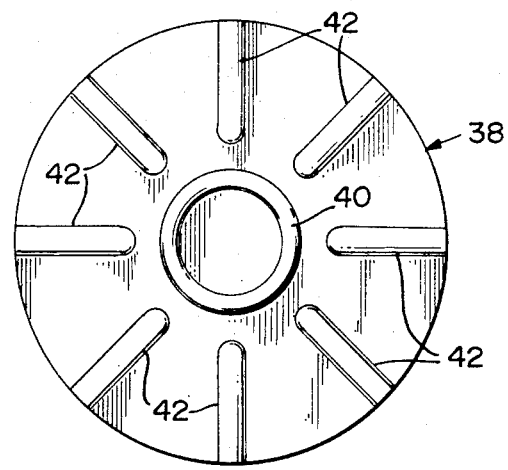
FIG. 4 is a section of another embodiment of a pressure regulator according to the present invention.

Another embodiment of the present invention is illustrated in FIG. 4 and parts of the embodiment of FIG. 4 which are identical to parts of the embodiment of FIG. 1 are given identical reference numbers and not described again. The primary difference between the embodiments of FIGS. 1 and 4 is that the flexing member is integrally formed from a single spring member 60 providing diaphragm, pan and spring functions in the pressure regulator 61 of FIG. 4. Spring member 60 is made of a thin, flexible metal, such as brass, and has raised radial string thining ribs 62 abutting fulcrum 50 concentric with an annular rib 64, and the peripheral margin 66 of spring member 60 is flat to engage surface 56 of the rim 54 of cover 44. The inner ends of ribs 62 define a weakened flexure ring 67 about which the disc 60 flexes with changes in outlet pressure causing movement of the disc about fulcrum 50. Housing 12 is formed with an annular recess 68 in a shoulder 70, and an O-ring 72 is disposed in recess 68 to engage the peripheral margin 66 of the spring member to form a fluid tight seal.

The operation of the pressure regulator 61 is the same as that described above with respect to pressure regulator 10, and the pressure regulator 61 can be set point calibrated during assembly by pressing the cover 44 into the housing to compress the O-ring 72 to various degrees.

Inasmuch as the present invention is subject to many modifications, variations and changes in detail, it is intended that all matter described above or shown in the accompanying drawings be interpreted as illustrative and not in a limiting sense.

What is claimed is:

1. A pressure regulator comprising;

a housing having inlet and outlet ports therein and a valve seat communicating with said inlet port;

flexing means including diaphragm means having a peripheral margin mounted in said housing and valve face means disposed to cooperate with said valve seat to control flow therethrough and spring means having a flexure ring surrounding said valve face means, said flexing means being flexible about said flexure ring; and cover means for retaining said flexing means in said housing and including fulcrum means engaging said flexing means at a position between said peripheral margin and said flexure ring whereby flexing of the area of said flexing means between said position engaging said fulcrum means and said peripheral margin in a first direction causes movement of said valve face means in a second direction opposite said first direction.

2. The pressure regulator as recited in claim 1 wherein said housing has a side wall having a cylindrical inner surface, and said cover means has an outer rim having a diameter substantially equal to the diameter of said inner surface and frictionally engaging said inner surface to retain said flexing means in said housing.

3. The pressure regulator as recited in claim 2 wherein said inner surface of said side wall terminates at an annular shoulder, and said outer rim has a bottom surface clamping said peripheral margin of said flexing means against said shoulder with a fluid tight seal.

4. The pressure regulator as recited in claim 3 wherein said shoulder includes an annular bead defining a recess in said shoulder, and said diaphragm means includes a rubber diaphragm having said peripheral margin clamped between said bottom surface of said rim of said cover means and said annular bead.

5. The pressure regulator as recited in claim 4 wherein said spring means is a thin, flexible metal disc secured to said diaphragm.

6. The pressure regulator as recited in claim 5 wherein said disc has a plurality of radial ribs extending from flexure ring to the periphery of said disc and said fulcrum means has an annular configuration and engages said radial ribs.

7. The pressure regulator as recited in claim 6 wherein said disc has a central annular rib, and said flexure ring is defined by the depressed portion between said annular rib and the ends of said radial ribs.

8. The pressure regulator as recited in claim 3 wherein said shoulder has an annular recess therein, and said flexing means includes an O-ring disposed in said recess to seal against said peripheral margin of said diaphragm means.

9. The pressure regulator as recited in claim 8 wherein said diaphragm means and said spring means are integrally formed in a single, thin flexible metal disc, said disc having strengthening rib means surrounding said flexure ring, and said fulcrum means has an annular configuration and engages said rib means.

10. The pressure regulator as recited in claim 1 wherein said diaphragm means is a rubber diaphragm and said spring means is a thin flexible metal disc secured to said diaphragm.

11. The pressure regulator as recited in claim 10 wherein said cover means is press fitted in said housing and has an annular projection forming said fulcrum means.

12. The pressure regulator as recited in claim 11 wherein said disc has strengthening rib means surrounding said flexure ring and engaging said fulcrum means.

13. The pressure regulator as recited in claim 1 wherein said diaphragm means and said spring means are integrally formed in a single, thin, flexible metal disc.

14. The pressure regulator as recited in claim 13 wherein said cover means is press fitted in said housing and has an annular projection forming said fulcrum means.

15. The pressure regulator as recited in claim 14 wherein said disc has strengthening rib means surrounding said flexure ring and engaging said fulcrum means.

* * * * *